Patented Apr. 1, 1952

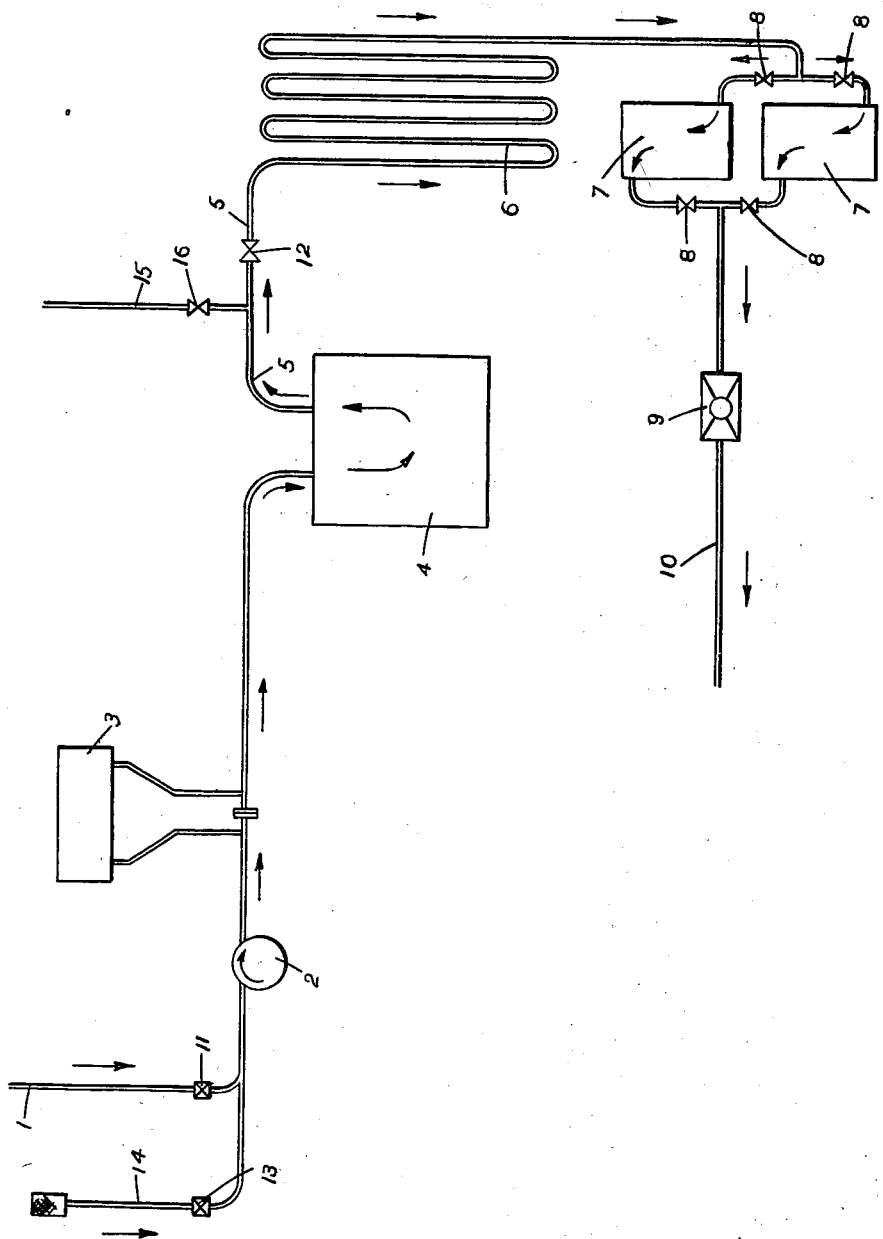

2,591,543

UNITED STATES PATENT OFFICE 2,591,543

CATALYTIC TREATMENT OF INDUSTRIAL GASES

Frederick Wardle Haywood and Douglas Stuart Laidler, Watford, England, assignors of one-half to Wild-Barfield Electric Furnaces Limited, Watford, England Original application August 30, 1945, Serial No. 613,572. Divided and this application October 28, 1947, Serial No. 782,660. In Great Britain February 28, 1945

6 Claims. (Cl. 23—2)

This invention is for improvements in or relating to the removal of carbon dioxide from industrial carbonaceous gases utilising a catalyst as claimed in our co-pending application, Serial No. 613,572, filed August 30, 1945, issued July 13, 1948, as Patent No. 2,444,930, of which this is a division and has for an object to provide a process for the removal of carbon dioxide, oxygen and sulphur-containing gases from industrial gases such as town's gas and other carbonaceous gases used in industry for the formation for example of carburising atmospheres for the treatment of ferrous alloys.

The constituents in such industrial gases which are the most valuable for effecting carburising are carbon monoxide and methane and the removal of carbon dioxide and oxygen from gases containing also carbon monoxide and methane has presented a problem of some difficulty since the destruction of carbon monoxide and methane is wholly undesirable.

According to our co-pending application Serial No. 613,572 there is provided a catalyst consisting essentially of barium carbonate extended with fibrous substantially iron-free asbestos. The catalyst is preferably prepared in the form of lenticular or lamellar shapes so as to present the greatest possible effective area of catalyst to the gas stream without at the same time imposing an undue resistance to gaseous flow. Preferably the ratio of the alkaline earth metal salt to the asbestos is of the order of 2:1 by weight.

This catalyst is particularly effective for the removal of carbon dioxide and oxygen contained in the industrial gases referred to and the following table illustrates the analysis of an average town's gas before and after passage over the catalyst claimed in that application, the figures quoted being stated as percentages by volume:

Gas analysis

| Gas | $CO_2$ | $O_2$ | Cn Hm | CO | $CH_4$ | $H_2$ | $N_2$ (balance) |
|---|---|---|---|---|---|---|---|
| Untreated | 3.3 | 0.6 | 2.5 | 16.7 | 23.8 | 48.6 | 4.5 |
| Treated | 0.0 | 0.0 | 0.6 | 21.0 | 23.8 | 49.5 | 5.1 |

The percentage figures quoted in the table above are average figures taken from 80 analyses spread over a period of 8 to 9 months.

The analysis of town's gas for supplies in the U. K. may usually be taken to fall within the following limits:

| | Per cent |
|---|---|
| Carbon dioxide | 2 – 5 |
| Oxygen | 0.5– 1 |
| Unsaturated hydrocarbons | 1.5– 3.5 |
| Carbon monoxide | 14 –20 |
| Methane | 15 –30 |
| Hydrogen | 45 –55 |

The balance being nitrogen.

In use the catalyst is charged into a catalyst chamber and the gases passed over the catalyst, preferably by passing them through a catalyst bed in the chamber, whilst maintaining the catalyst at a temperature of about 900° C.

The catalyst has a very satisfactory life and is readily regenerated by passing air over the exhausted catalyst.

In use, the catalyst in the container is placed in a furnace and heated to a temperature of the order of 900° C. whereafter town's gas is led through the catalyst container. The useful life of the catalyst between regenerations for the treatment of town's gas of the analysis quoted in the table given above is 120 hours for a gas flow of 50 cubic feet per hour. Under the conditions specified it will be appreciated that after this time the catalyst is still capable of removing most of the carbon dioxide and oxygen but not to completion.

Under practical conditions of working, the temperature of the treatment does not vary greatly from 900° C.: the quantity of catalyst and the temperature used for a given gas flow are such as, subject to a required useful life before regeneration, will remove the $CO_2$ and $O_2$ effectively without destroying considerable amounts of methane. Practical examples will serve to indicate the permissible temperature variation. Using some 4–5 lbs. of the catalyst claimed in our application No. 613,572 in a container of a volume of from ¼ to ⅓ ft.³, at 900° C. destruction of methane is negligible with a gas flow as low as 10 ft.³/hr. If lower gas rates used then the temperature should be reduced, say to 850–875° C. Carbon dioxide and oxygen are still removed but the methane will crack if the temperature is not reduced, e. g. at 5 ft.³/hr., 2% of $CH_4$ destroyed at 900° C., no $CH_4$ cracking at 850°.

On the other hand if the gas flow is 50 ft.³/hr., then at 900° C. the $CO_2$ and $O_2$ are completely removed, without $CH_4$ cracking, but at 850° C. the residual $CO_2$ will be of the order of 0.5 to 0.6%.

The upper limit of the temperature is again dictated by the gas flow used, e. g. at 950° C.

some 2% of the CH₄ will crack if the gas flow is 50 ft.³/hr. but cracking is negligible if the gas flow is 80–100 ft.³/hr. or more.

For gas flows higher than 100 ft.³/hr. the maximum temperature could be increased safely to 975° C. or more without appreciable CH₄ destruction and to give good CO₂ and O₂ removal.

A possible explanation of the catalytic reactions between unsaturated hydrocarbons, CO₂ and O₂ results in the elimination of all CO₂ and O₂ with definite decrease in the percentage of unsaturated hydrocarbons making possible an increase in H₂ content. The nitrogen figure in the table is not an estimated figure but constitutes the balance of the gas to a total of 100% and it would be very surprising if these figures agreed over such a long period. It is believed that they are well within the limits of experimental determination. Unless barium carbonate is present in the catalyst the CO₂ and O₂ of the town's gas passes forward. It is probable that the barium carbonate catalyses the formation of CO from CO₂, C, and O₂.

The regeneration of the catalyst is readily effected by leaving the furnace heating conditions unaltered, or substantially unaltered, and passing a stream of air over the catalyst preferably through the catalyst bed at such a rate of flow that the catalyst at the inlet end, i. e. that end which the incoming air first meets, does not rise above 1100° C. The rise in temperature is due to exothermic reactions taking place during the regeneration of the catalyst.

The time of regeneration is of the order of 3 to 4 hours and will naturally depend upon the degree of fouling or exhaustion of the catalyst.

After regeneration and when raw town's gas is the gas undergoing treatment, there is a time lag usually of about 1 hour before the effluent gas from a catalyst container can be used with safety for gas carburising.

It is important that all metal parts with which the gases come into contact, such as the inlet and outlet pipes, the grids, supports, thermocouple sheath tubes, baffles and other parts of the catalyst container should be constructed of difficultly carburisable heat-resistant materials. The reason for this is that traces of iron lead to a diminution in the methane and carbon monoxide content of the gases and it is this effect which has presented difficulties in prior processes for the removal of carbon dioxide and oxygen from this class of industrial gas.

The accompanying diagrammatic drawing illustrates the following brief description of a plant for the treatment of town's gas to provide a carburising atmosphere for the treatment of ferrous alloys.

The coal gas is led through an intake pipe 1 to a compressor 2 wherein it is compressed and led through a flow meter 3 to the catalyst container described above, disposed within an electrically or otherwise suitably heated furnace generally indicated at 4, this furnace being adjusted to give a temperature of the order of 900° C. The outlet 5 from the catalyst container is taken via a cooler 6 to a drying tower in this case packed with silica gel, there being two drying towers 7 arranged in parallel with appropriate valves 8 so that the driers may be used alternately, one being in use whilst the other is being regenerated. From the drying towers the gas is passed through an integrating meter 9 by pipe 10 to the gas carburising furnace or the like, where it is to be used. In order to permit of regeneration of the catalyst, valves 11, 12 are inserted respectively in the gas inlet to the compressor and in the gas outlet from the catalyst chamber so as to isolate those elements of the apparatus from the rest of the plant and a valve 13 in a second inlet pipe 14 to the compressor is operated so that the compressor can aspirate air and pass it into the catalyst container. An outlet pipe 15 from the catalyst container (for convenience of definition referred to hereinafter as an air outlet) is opened by operating valve 16 to allow the gases from the regeneration treatment to escape.

Whilst the foregoing description has been primarily directed to the treatment of town's gas it will be understood that it can be successfully operated to treat gases used in industry for the preparation of carburising atmospheres.

We claim:

1. A process of removing carbon dioxide and oxygen from industrial gases comprising passing the gas over a catalyst consisting of barium carbonate extended with substantially iron-free asbestos at a suitable temperature in the region of 900° C.

2. A process of removing carbon dioxide and oxygen from industrial gases containing hydrocarbons comprising passing the gas over a catalyst consisting of barium carbonate extended with substantially iron-free fibrous asbestos at a suitable temperature in the region of 900° C.

3. A process as in claim 2 including periodical regeneration of the catalyst by passing a stream of air over the catalyst under heating conditions and at rate of flow such that the temperature at the inlet end is above 900° C. and does not rise substantially above 1100° C.

4. A process as in claim 2 including periodical regeneration of the catalyst by passing a stream of air over the catalyst under substantially unaltered heating conditions and at such rate of flow that the temperature at the inlet end does not rise substantially above 1100° C.

5. A process for treating industrial gases containing hydrocarbons for the removal of carbon dioxide and oxygen therefrom comprising the steps of compressing the said gas, passing it through a heated catalyst chamber containing barium carbonate extended on fibrous asbestos, cooling the said gas and drying the said gas.

6. A process for the treatment of industrial gases as in claim 5 in which the catalyst is periodically regenerated by passing a stream of air over the catalyst under substantially unaltered heating conditions and at such a rate of flow that the temperature at the inlet to the said catalyst chamber does not rise substantially above 1100° C.

FREDERICK WARDLE HAYWOOD.
DOUGLAS STUART LAIDLER.

REFERENCES CITED

The following references are of record in the file of this patent:

UNITED STATES PATENTS

| Number | Name | Date |
|---|---|---|
| 2,214,926 | Gutherie et al. | Sept. 17, 1940 |